(12) United States Patent
Ziaei

(10) Patent No.: US 7,755,866 B1
(45) Date of Patent: Jul. 13, 2010

(54) VERTICALLY COUPLING ACTUATOR ARM FOR DISC DRIVES

(75) Inventor: Shahyar Ziaei, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 725 days.

(21) Appl. No.: 11/504,493

(22) Filed: Aug. 15, 2006

Related U.S. Application Data

(60) Provisional application No. 60/801,709, filed on May 19, 2006.

(51) Int. Cl.
    *G11B 5/55* (2006.01)
(52) U.S. Cl. ..................................... 360/266
(58) Field of Classification Search ............... 360/266, 360/265.9
    See application file for complete search history.

(56) References Cited

U.S. PATENT DOCUMENTS

| 6,826,009 | B1 * | 11/2004 | Scura et al. | 360/97.03 |
| 7,440,234 | B1 * | 10/2008 | Cheng et al. | 360/266 |
| 2003/0053261 | A1 * | 3/2003 | Thia et al. | 360/266 |
| 2005/0007701 | A1 | 1/2005 | Oh et al. | |
| 2005/0141135 | A1 * | 6/2005 | Soga et al. | 360/97.02 |
| 2006/0114614 | A1 * | 6/2006 | Tsujino et al. | 360/266 |
| 2006/0209456 | A1 * | 9/2006 | Bisuwasu et al. | 360/97.02 |
| 2007/0115590 | A1 | 5/2007 | Resh et al. | |

* cited by examiner

*Primary Examiner*—David D Davis
(74) *Attorney, Agent, or Firm*—Intellectual Property Law Offices of Joel Voelzke, APC

(57) ABSTRACT

A support arm for use in a disc drive suspension includes an asymmetry that creates a vertical coupling in the support arm, i.e., a slight lateral movement of the support arm distal end to which a load beam is mounted in response to vibration-induced bending of the support arm. The vertical coupling in the support arm at least partially cancels out during arm bending any vertical coupling which has been designed into the coupling between the load beam and the support arm to reduce track misregistration during flow-induced vibrations of the disc surface. In this way, track misregistration during both flow-induced vibrations and during arm bending is reduced. In a preferred embodiment the asymmetry is created by at least one of a first notch along an inside top edge of the arm, and a second notch along a bottom outside edge of the arm.

9 Claims, 13 Drawing Sheets

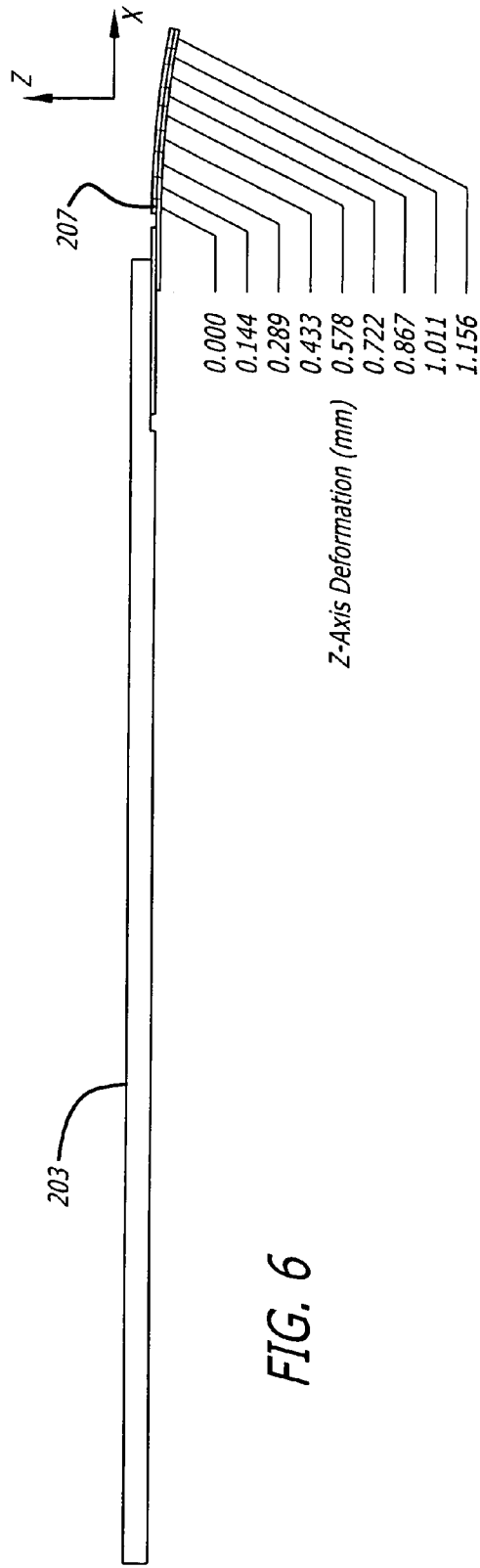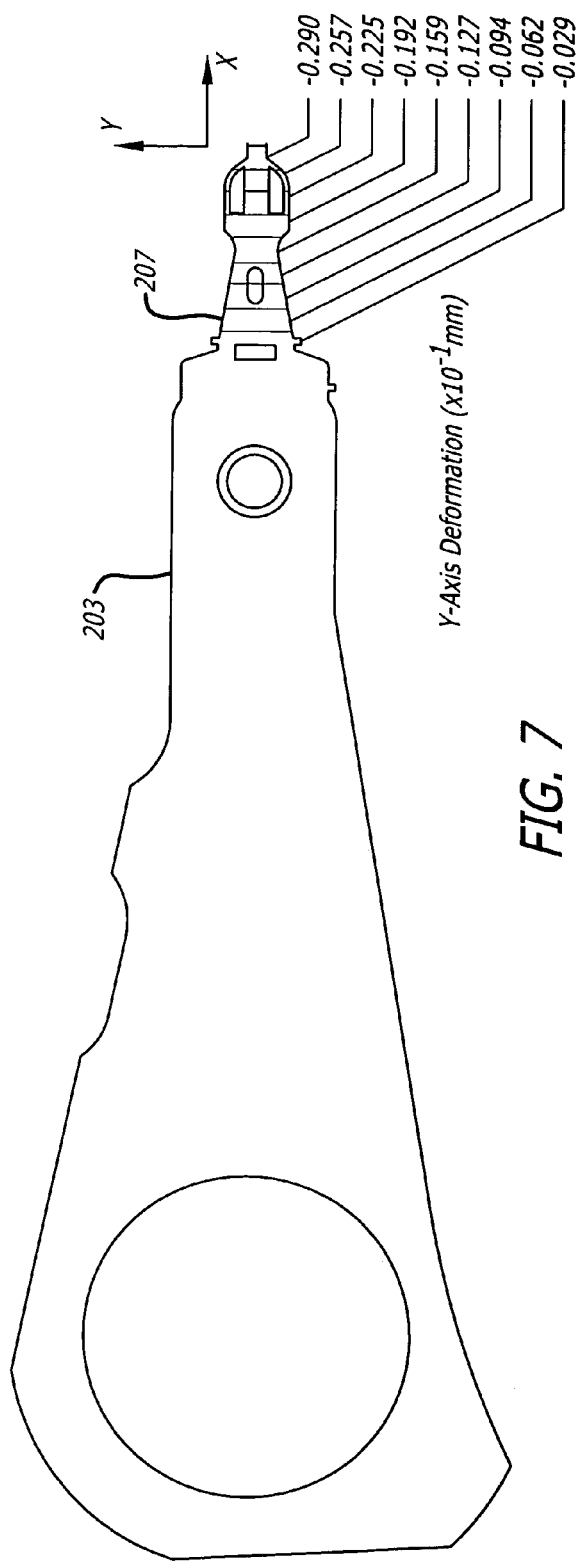
FIG. 6
FIG. 7

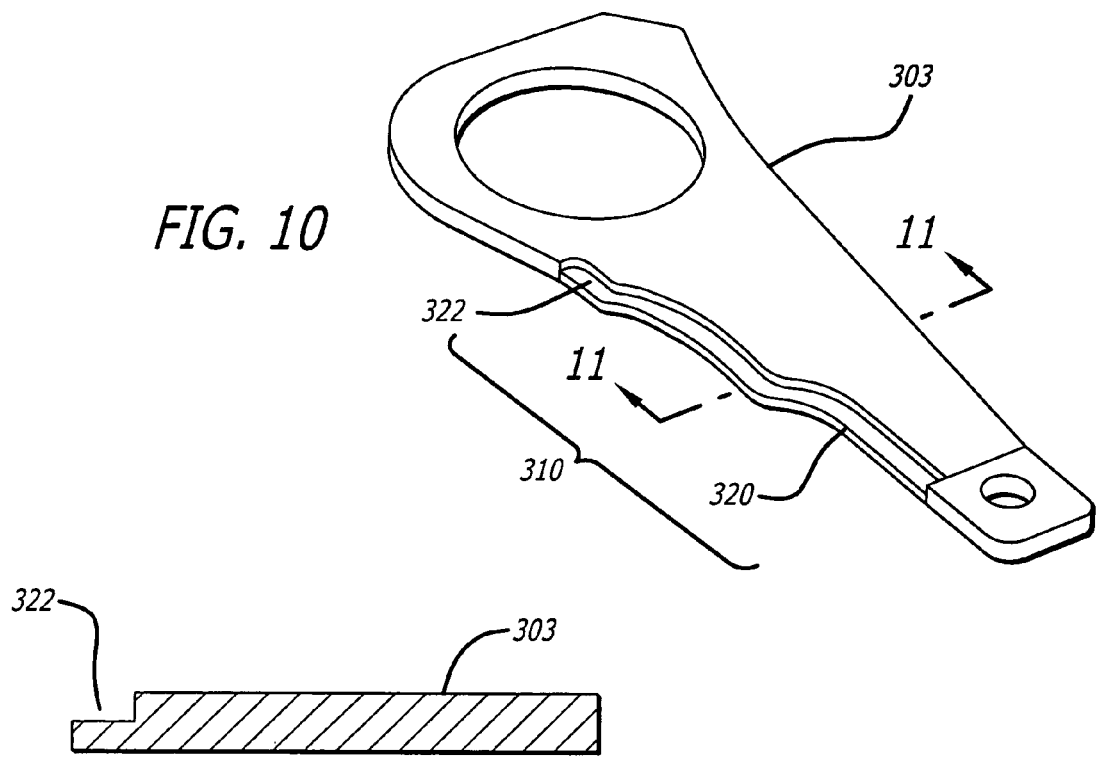
FIG. 10
FIG. 11
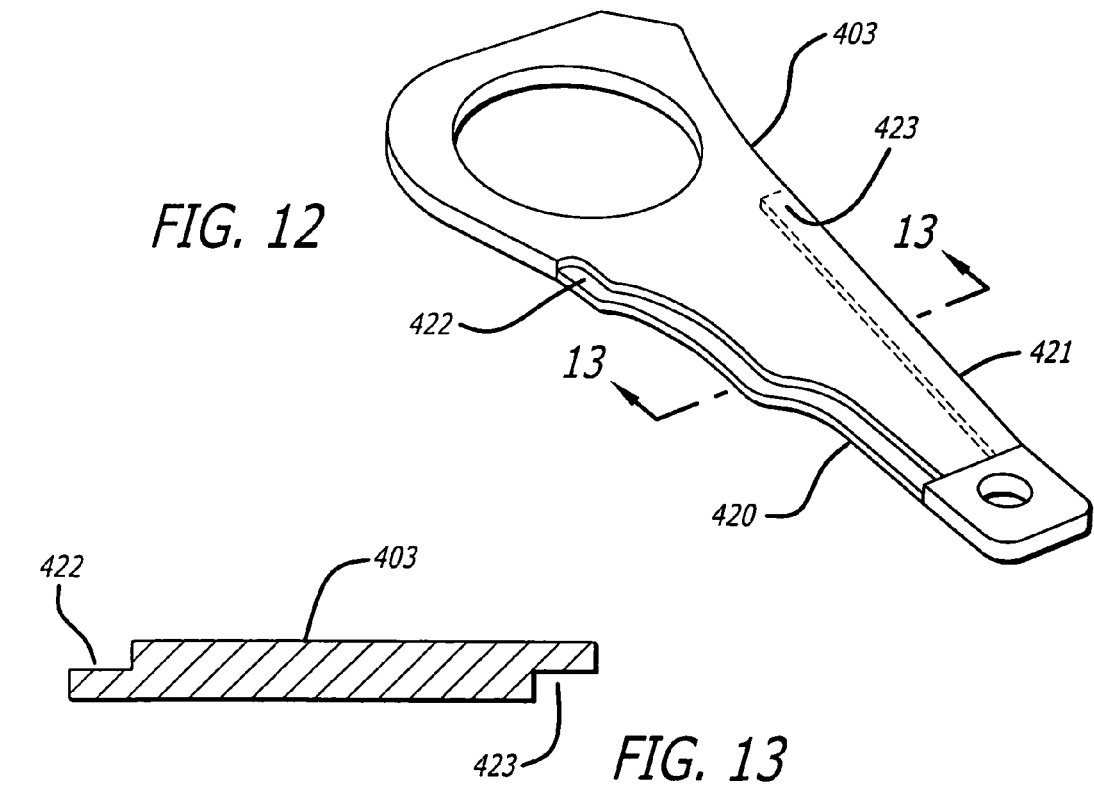
FIG. 12
FIG. 13

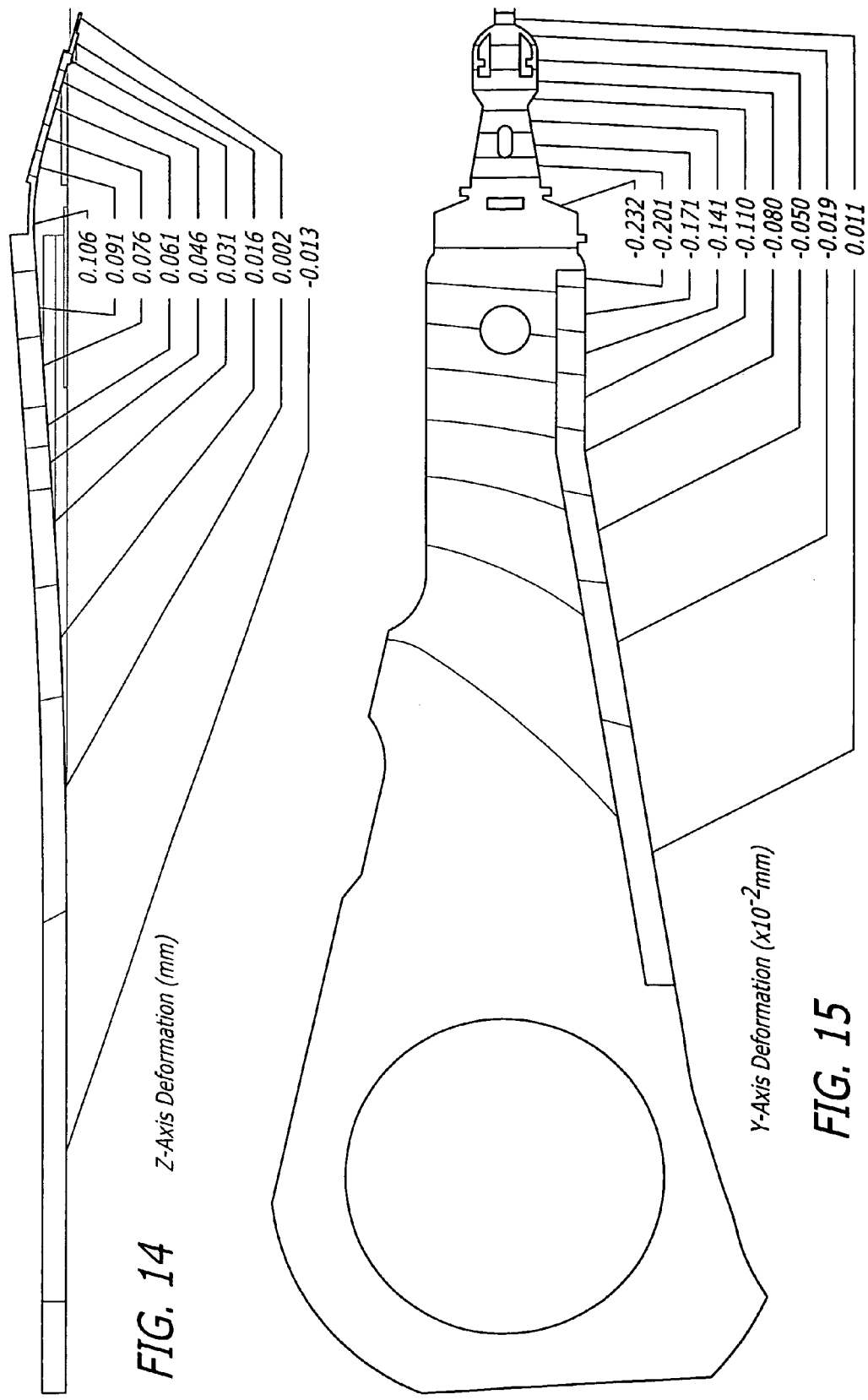

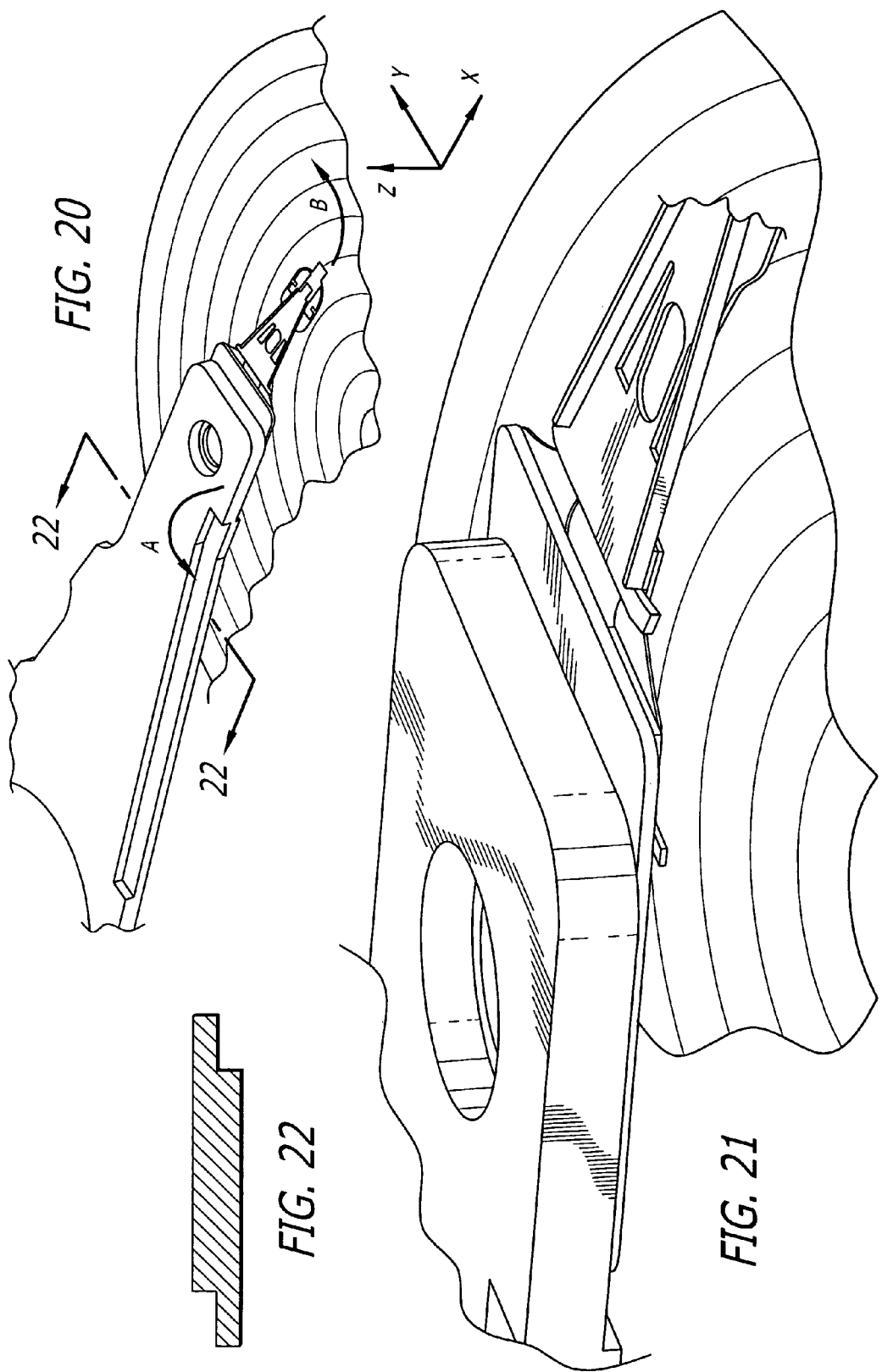

VERTICALLY COUPLING ACTUATOR ARM FOR DISC DRIVES

CROSS-REFERENCE TO RELATED APPLICATIONS

This application claims priority from U.S. Provisional Patent Application No. 60/801,709 filed May 19, 2006.

BACKGROUND OF THE INVENTION

1. Field of the Invention

The present invention generally relates to an actuator arm for a disc drive apparatus. More particularly, the present invention relates to an actuator arm with a vertical coupling feature for compensating for arm bending induced track misregistration (TMR) in disc drives.

2. Description of Related Art

A hard disc drive (HDD) unit generally uses a spinning storage medium (e.g., a disc or platter) to store data. A read-write head is positioned in close proximity to the spinning storage medium by a Head Stack Assembly (HSA). Mounted on the HSA, a suspension assembly commonly includes a base plate, a load beam, and a flexure trace gimbal to which a slider is mounted. The suspension is mounted to a support arm, also called an actuator arm or a suspension arm. The slider supports the read-write transducer head element. The load beam is generally composed of an actuator mounting section, a spring region, and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disc surface.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disc flutter. Disc flutter is an aero-elastic instability induced by the coupling of the spinning storage medium and the air surrounding the media resulting in disc vibration modes. These flow induced vibrations can physically cause an off-track misalignment of the head to the desired track resulting in failure to access or write data on the right track. The lateral (Y-axis) movement of the track associated with vertical (Z-axis) movement of the track due to disc flutter is characterized by:

$$VC = \frac{\Delta Y_{track} + \Delta Y_{head}}{\Delta Z} \text{ where}$$

$$\Delta Y_{track} = \frac{t_{disc}}{2} \cdot \text{Sin}(\theta),$$

$$\Delta Y_{head} = t_{slider} \cdot \text{Sin}(\theta), \text{ and}$$

$$\theta \approx \frac{3 \cdot \Delta Z}{2 \cdot L_{track\_to\_ID}} \text{ for } (\Delta Z_{head} << L_{track\_to\_ID})$$

which leads to $$\Rightarrow VC = \frac{3 \cdot (t_{disc} + 2 \cdot t_{slider})}{4 \cdot L}$$

Problems associated with disc flutter become more intolerable with higher track densities and disc rotation speeds.

Techniques have been previously developed by the assignee of the present application for compensating for track misregistration caused by disc flutter. Those techniques involved structures for the hinges coupling the load beam to the suspension arm, that introduced a vertical coupling as the hinges flex. That is, as the hinges flexed, a large vertical upward bending of the load beam caused a small horizontal movement at the slider end of the load beam.

In one embodiment, the previously developed approach involved introducing a vertical offset in the hinges that join the load beam to the suspension arm, with the vertical offset being created by various possible techniques including: attaching one hinge to the top of the load beam and the suspension arm, and a second hinge to the bottom of the load beam and the suspension arm; introducing a shim spacer between one of the hinges and the load beam, or between one of the hinges and the suspension arm, or both; and etching the load beam and/or the suspension arm to form either a lowered region or a raised mesa on the load beam and/or the hinge to which the suspension spring is mounted. The vertical coupling allowed the slider to track the designed data track on the disc platter as the platter bent due to vibration. As the platter bent upward, the load beam bent upward and the slider moved slightly horizontally toward the inside of the platter; conversely, as the platter bent downward, the load beam bent downward and the slider moved slightly horizontally toward the outside edge of the platter. In both cases, the result was that the slider stayed more closely aligned over the desired data track on the disc platter surface during disc bending. The foregoing techniques will be collectively referred to as offset suspension hinges as shorthand, although it will be understood that the techniques discussed below apply to the general case of compensating for vertical coupling within the load beam regardless of whether the vertical coupling within the load beam is created by offset hinges or by some other structure or arrangement.

If the suspension has a non-zero product moment inertia Iyz, then loading in the Z direction results in a spatial shift in the Y direction, i.e., the suspension has a YZ coupling. The movement is characterized by:

$$\vec{F} = [K] \cdot \vec{X} = c \cdot [I] \cdot \vec{X}$$

$$c \bullet \begin{bmatrix} Ixx & 0 & 0 \\ 0 & Iyy & Iyz \\ 0 & Iyz & Izz \end{bmatrix} \bullet \begin{bmatrix} 0 \\ 0 \\ U_z \end{bmatrix} = c \begin{bmatrix} 0 \\ Iyz \cdot Uz \\ Izz \cdot Uz \end{bmatrix}$$

$$Iyz = \iint y \cdot z \cdot dA$$

If symmetry in either the XZ plane or the YZ plane exists then:

$$Iyz = 0$$

BRIEF SUMMARY OF THE INVENTION

Although introducing a vertical coupling into the load beam to compensate for disc flutter reduces one type of track misregistration, doing so has an unintended and undesirable side effect. Disc flutter induced movement is only one mode of movement in a suspension. Another mode of movement is movement caused by arm vibration. When a suspension arm vibrates, such as for example because of vibration caused by the disc drive motor, the distal end of the suspension arm bends upward, and the load beam bends downward so that the slider remains near the surface of the platter. This situation is shown in FIG. 8. Because the hinge is bent downward, the vertical coupling produced by the offset hinges causes a small lateral movement of the slider head. That is, the slider head moves in a direction perpendicular to the direction of the desired data track, thus creating a new kind of TMR. This situation, and the error introduced by it, will be called arm induced TMR.

In order to compensate for arm induced TMR, the inventor of the present invention has discovered that the suspension arm itself may be constructed so that it has a vertical coupling behavior of its own that is in the opposite direction, and hence cancels out, the vertical coupling in the load beam caused by the offset hinges during arm bending. In one embodiment, the suspension arm is formed with an asymmetry, such as one or more notches in either the top and/or the bottom lateral edges of the arm, so that as the arm bends the distal end of the arm where the hinges are mounted moves a slight distance laterally, i.e., generally parallel to the surface of the rotating disc. In a broad sense the present invention is of forming or constructing a suspension arm to give it a vertical coupling that, at least to some extent, cancels out vertical coupling in the suspension hinges during arm bending.

Various additional objects, features, and advantages of the present invention can be more fully appreciated with reference to the detailed description and accompanying drawings that follow.

BRIEF DESCRIPTION OF THE DRAWINGS

FIG. 6 is a side elevation view of a support arm and suspension having offset vertical hinges during disc flutter mode, showing Z-axis (vertical) deflections along the length of the load beam.

FIG. 7 is a top plan view of the support arm and suspension of FIG. 6, showing Y-axis (horizontal) deflections along the length of the load beam.

FIG. 10 is a perspective view of a support arm having an asymmetrical cross section and vertical coupling according to a first embodiment of the present invention, having a single notch formed in one side of the support arm.

FIG. 11 is a cross-sectional view of the support arm of FIG. 10 taken along line 11-11.

FIG. 12 is a perspective view of a support arm having an asymmetrical cross section and vertical coupling according to a second embodiment of the present invention, having a notch formed in each of two sides of the support arm.

FIG. 13 is a cross-sectional view of the support arm of FIG. 12 taken along line 13-13.

FIG. 14 is a side elevation view of a suspension having the asymmetrical support arm of the present invention during arm bending mode, and showing Z-axis (vertical) deformations according to a simulation.

FIG. 15 is a top plan view of the support arm and suspension of FIG. 14, and showing Y-axis (lateral) deformations.

FIG. 20 is a perspective view of a support arm according to the present invention, in combination with a suspension having offset hinges as previously known to the assignee of the present invention, over a data disc platter.

FIG. 21 is closeup of FIG. 20.

FIG. 22 is a cross-section view of the support arm of FIG. 20, taken along line 22-22.

DETAILED DESCRIPTION OF THE INVENTION

Figure 1:
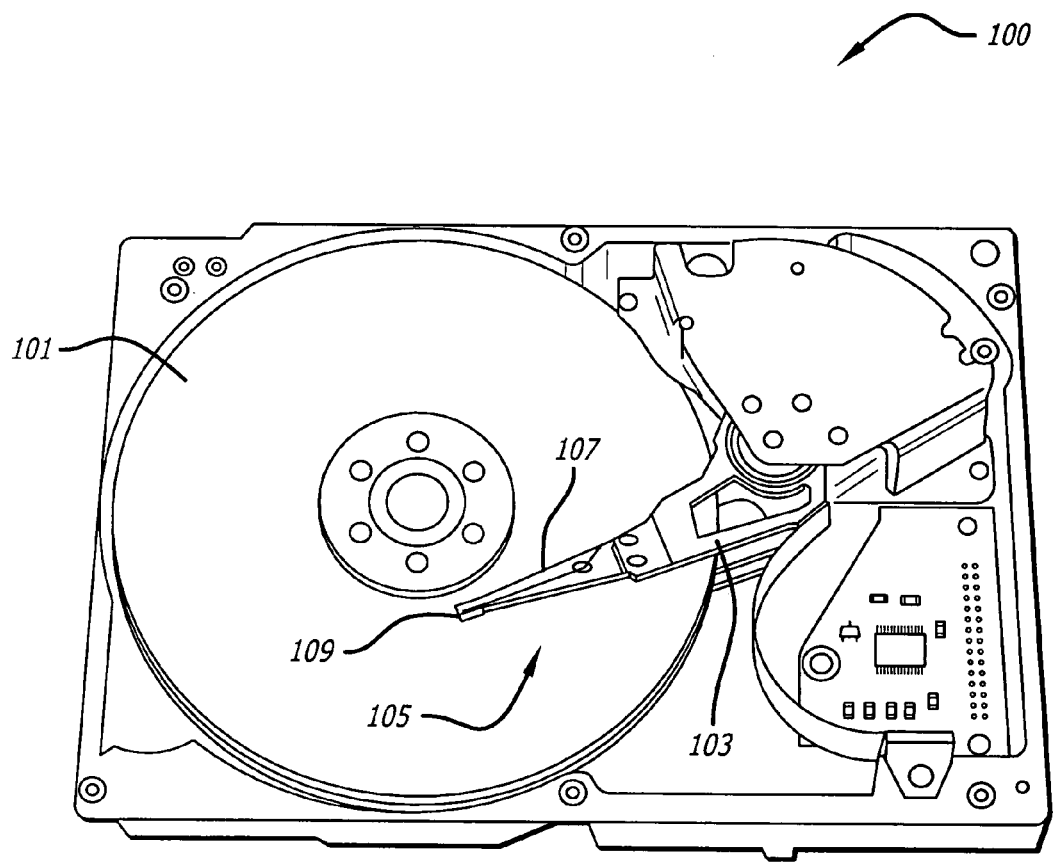
FIG. 1 is a perspective view of a generalized disc drive apparatus.

FIG. 1 is a simplified general diagram of a disc drive apparatus 100. Apparatus 100 includes at least one disc 101 (e.g., one, two, three, or more discs), at least one actuator arm or support arm 103 (e.g., one, two, three, or more actuator arms), and at least one suspension assembly 105 (e.g., one, two, three, or more suspension assemblies). Each suspension assembly is composed of a load beam 107 and a flexure trace gimbal assembly 109. The suspension assembly, with trace gimbal assembly and read/write transducer head, may be referred to as a Head Gimbal Assembly (HGA).

Disc 101, commonly called a platter, rotates about a fixed axis (or spindle) from about 5,000 rpm up to about 15,000 rpm depending upon the particular drive. Disc 101 stores information and thus often includes a magnetic medium such as a ferromagnetic material. More generally, the disk can include optical materials, commonly coated on surfaces of the disc, which become active regions for storing digital bit information. The present invention could apply to other data disc technologies as well.

The aggregate storage capacity of disc 101 will vary with track density and disc diameter. Disc 101 stores information in tracks which can be in a range of about 50,000 tracks per inch (TPI) to about 200,000 TPI, or more. The diameter of disc 101 can be 5.12 inches (e.g., for a 5.25 inch drive), 3.74 inches (e.g., for a 3.5 inch drive), or less than 2.5 inches, or even less than 1.8 inches or 1.0 inch.

Suspension assembly 105, which overlies (or underlies) a surface of disc 101, operates and controls a slider coupled to a read/write head (not shown). Flexure trace gimbal assembly 109 is attached to suspension assembly 105 which is in turn is connected to the distal end of actuator arm 103. Actuator arm 103 is connected at its proximal end to a voice coil motor or VCM, which moves suspension assembly 105 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

The bending modes that are inherent in a suspension arm show up as peaks in the frequency response function (FRF), which is a transfer function equal to (slider lateral motion output) divided by (arm lateral motion input) as a function of frequency. Although vertical coupling via offset hinges cancels out vertical coupling due to disc flutter, the offset hinges create an unwanted vertical coupling and hence TMR during arm bending, as described previously.

Figure 2:
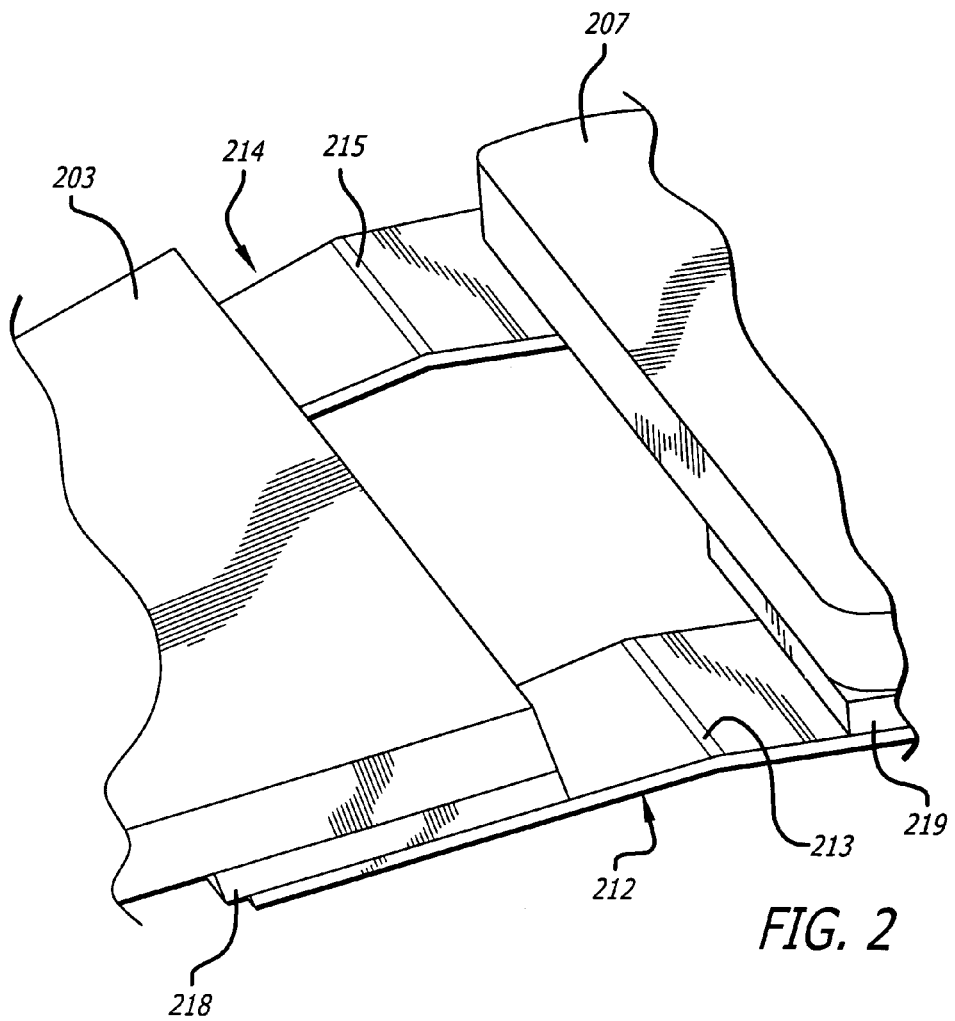
FIG. 2 is a perspective view of vertically offset hinges used to mount a suspension load beam to a support arm, as previously known to the assignee of the present invention.

FIG. 2 is a perspective view that illustrates one design previously known to the assignee of the present invention in which hinges offset by a shim create a vertical coupling in the suspension. Load beam 207 is coupled to distal end of actuator arm 203 via flexible hinges 212 and 214. The proximal end (not shown) of actuator arm 203 is coupled to an actuator motor for moving the suspension over the desired data track. Shims 218 and 219 offset hinge 212 from in-plane hinge 214. Bends 213 and 215 in hinge 212 and 214, respectively, angle the transducer head (not shown) toward the disk platter. The angle of the bend is sometimes called the sag of the suspension.

Figure 3:
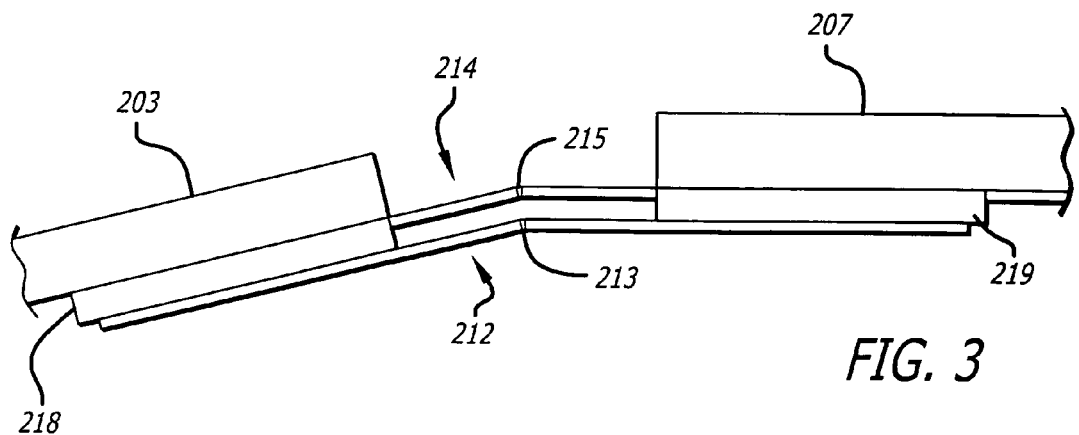
FIG. 3 is a side elevation view of the offset hinge mounting structure of FIG. 2.

FIG. 3 is a side elevation view of the offset hinges shown in FIG. 2.

Figure 4:
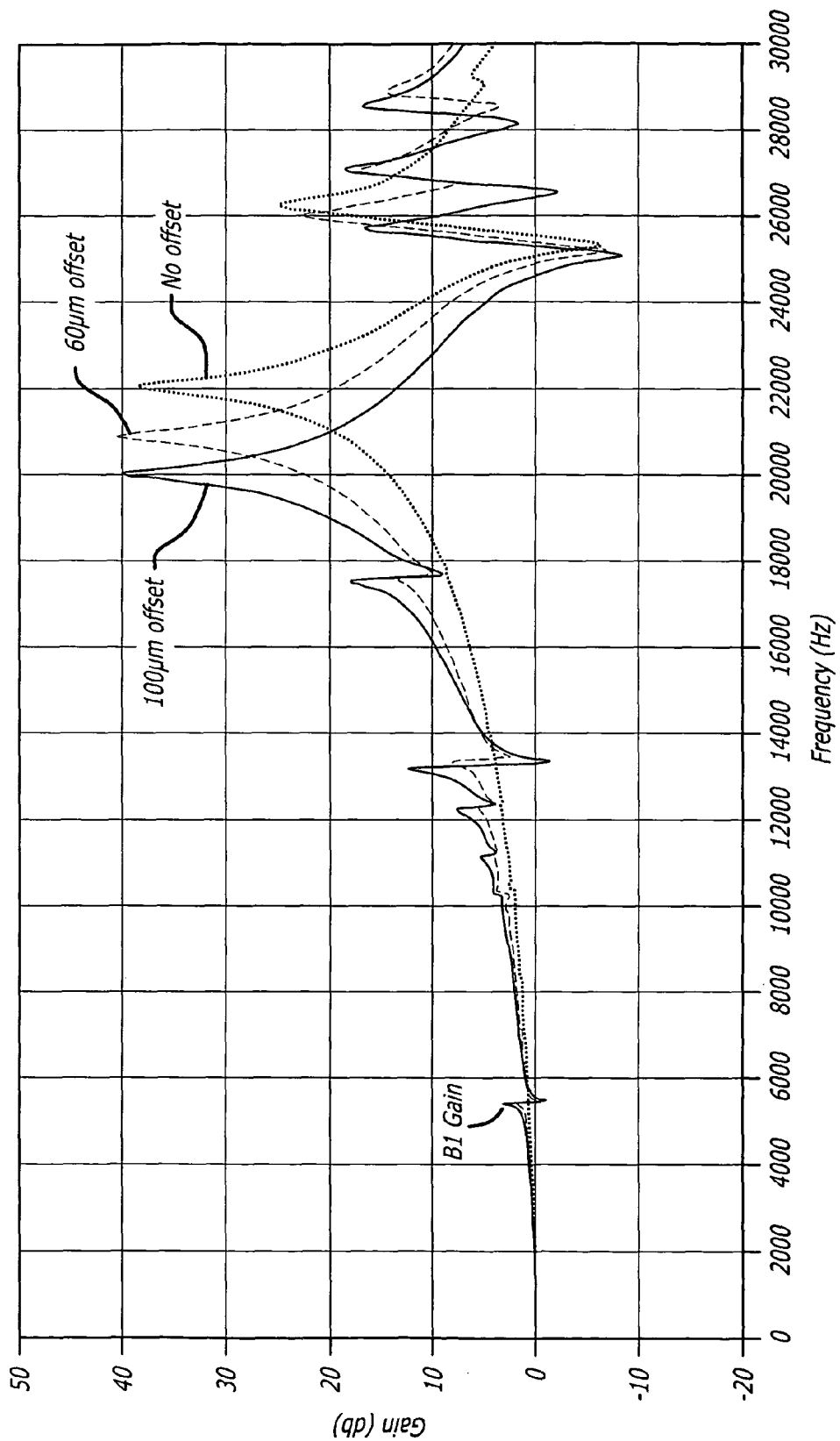
FIG. 4 is a plot of gain vs. frequency according to simulation results for the suspension of FIG. 2 for various hinge offset distances.

FIG. 4 shows the gain at the slider as a function of frequency, for different values of hinge offset in a first suspension assembly model which employs the basic offset hinge technique shown in FIG. 2. The gain is defined as:

Gain=(lateral displacement of the slider)/(lateral displacement of the base plate) due to vertical bending motion of the arm.

The B1 gain is the gain at approximately 550 Hz. It is generally desirable to make the various gains, and particularly the B1 gain, as small as possible. Offsetting the hinges in order to reduce disc flutter TMR, however, has the undesirable side effect of increasing the gains at frequencies corresponding to various bending modes including the B1 gain.

The hinge offset distance, and where the bend shown in FIGS. 2 and 3 is formed in the hinges, affect the vibrational gain. FIG. 4 is a plot according to a simulation of the gain at the slider as a function of frequency, for different hinge offset distances.

Figure 5:
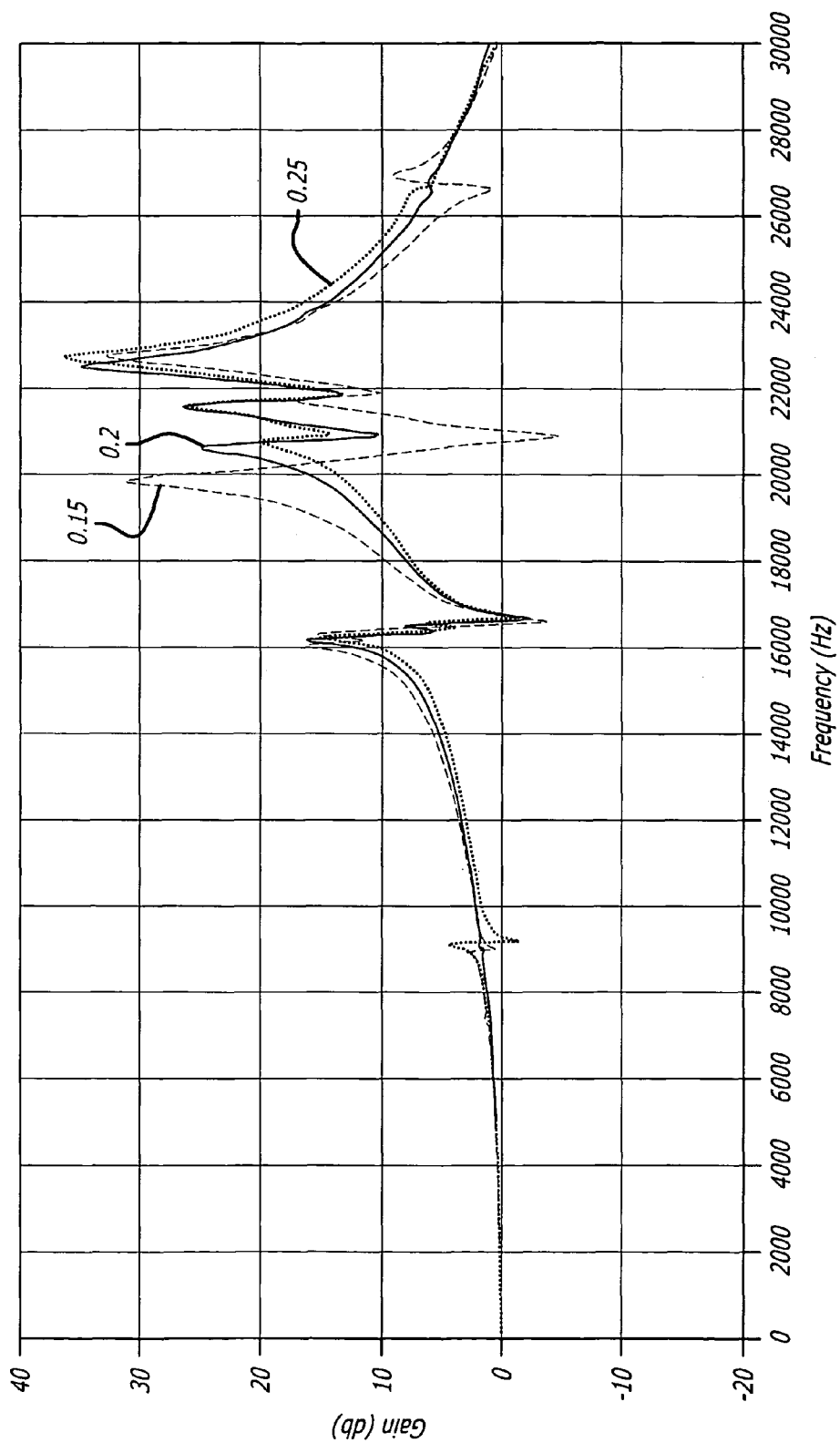
FIG. 5 is a plot of gain vs. frequency according to simulation results of the suspension of FIG. 2 with 3 degrees of hinge sag for various bend locations.

FIG. 5 is a plot according to a simulation of the gain at the slider as a function of frequency, for different distances in millimeters at which the bend is placed from the center of the bend of the hinge measured from the edge of the baseplate toward the suspension distal portion, for a 50 μm hinge and with 3 degrees of sag.

FIGS. 6 and 7 show the vertical coupling caused by the offset hinges under conditions of disc flutter according to a simulation. The actuator arm shows no lateral displacement because the head movement is being caused by disc flutter, which bends the load beam at the suspension hinges but does not appreciably bend the suspension arm.

FIG. 7 shows the vertical (Z-axis) displacement that corresponds to FIG. 6. The lateral displacement shown at the transducer head more or less cancels out the lateral displacement at the data track, resulting in little or no TMR. This is the basic operation of the offset hinges to reduce flutter induced TMR, as previously known to the assignee of the present invention.

Figure 8:
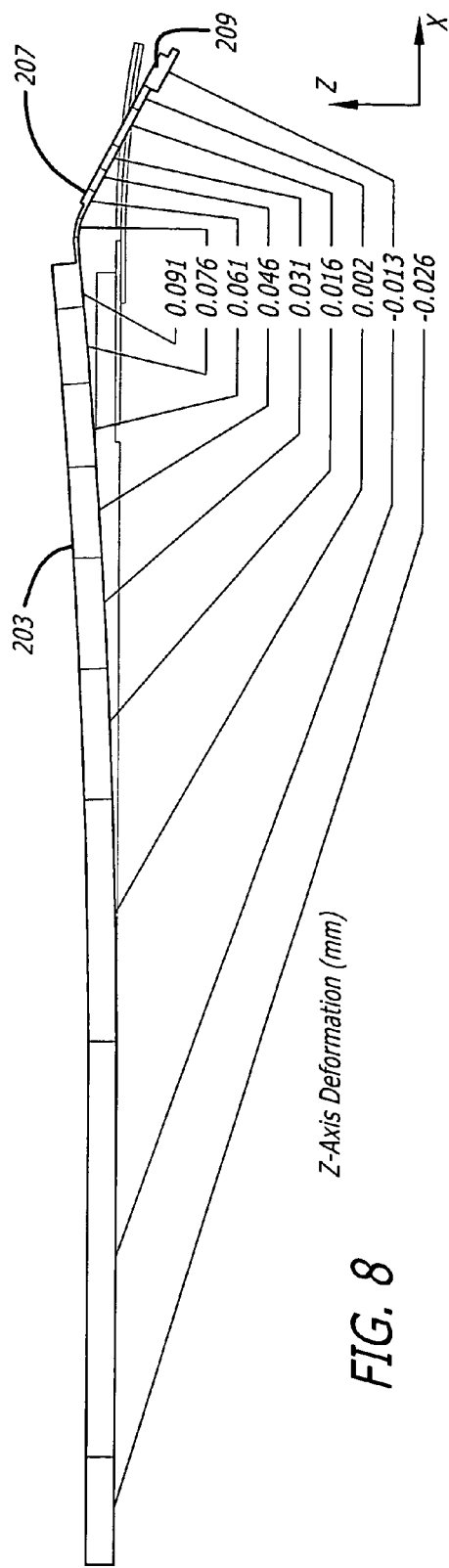
FIG. 8 is side elevation view of the support arm and suspension of FIG. 6 during arm bending mode, showing Z-axis (vertical) deflections along the length of the support arm and load beam.
Figure 9:
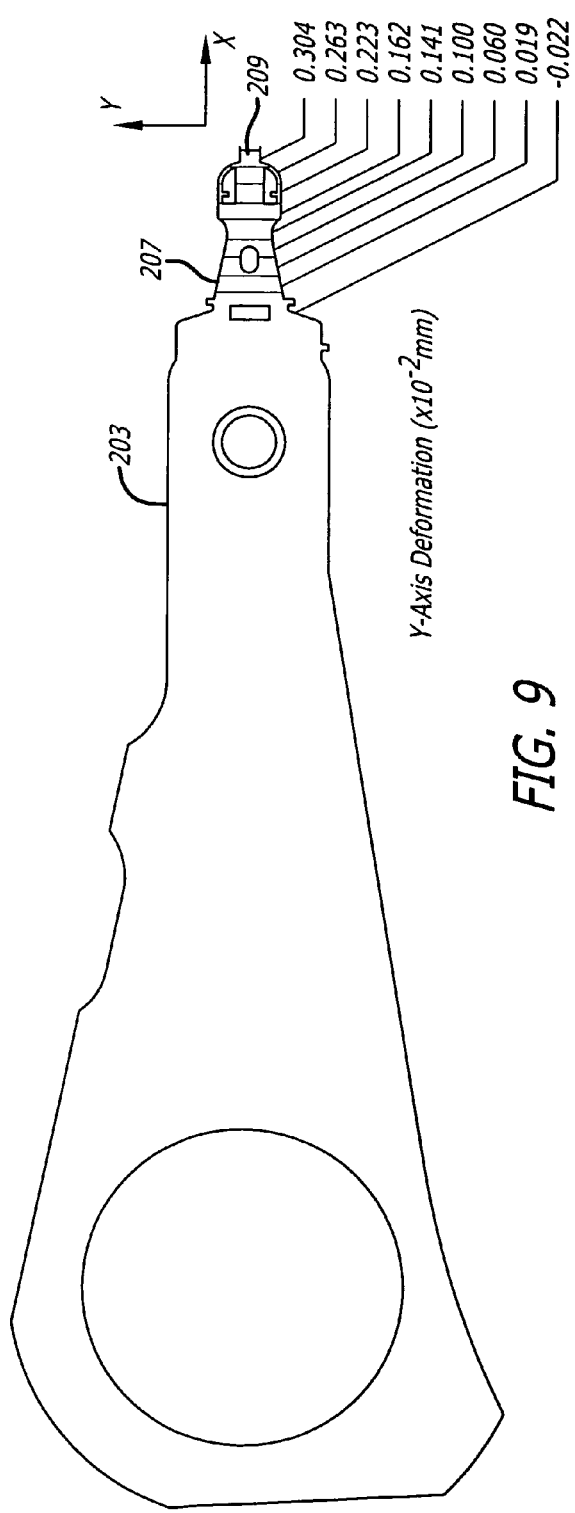
FIG. 9 is a top plan view of the support arm and suspension of FIG. 8, showing Y-axis (horizontal) deflections along the length of the support arm and load beam.

FIGS. 8 and 9 illustrate the problem of arm induced TMR that the present invention addresses. FIG. 8 shows the arm bending mode of movement in which vertical vibration causes the actuator arm 203 to bend upwards. Suspension 207 must therefore bend downward at the hinges in order for slider 209 to remain closely coupled to the disc track. The figure shows the Z-axis deformations or displacements in the arm bending mode according to a simulation.

FIG. 9 shows the Y-axis deformations that correspond to the Z-axis deformations shown in FIG. 8. Because suspension 207 is bent downward, the vertical coupling caused by the offset hinges produces a lateral displacement of slider 209. The surface of the disc platter, however, is not displaced laterally because the disc is not bent in arm bending mode. The result is that in the arm bending mode, the vertical coupling which is a result of the offset hinges actually produces TMR error.

According to the present invention, opposing YZ coupling is incorporated into the structure of the suspension arm so that it cancels the YZ coupling of the offset hinges caused by the arm bending. Possible implementations include: creating an asymmetrical structure such as a step or notch on one side of the top surface of the arm; creating an asymmetrical structure such as a step or notch on one side of the bottom surface of the arm; and creating one step or notch in the top surface and one step or notch in the bottom surface; or some other means of achieving a YZ coupling within the arm. The notches have a similar mechanical effect when the arm bends, as the effect that the offsetting of the hinges has when the hinges bend.

FIG. 10 shows a first illustrative embodiment of the present invention. Actuator arm 303 has a notch 322 formed along a first edge 320 of the arm, in this case along the top edge of the arm. The notch depth is preferably between 30% and 70% of the thickness of arm 303, and is one half or approximately one half the thickness of arm 303 in this particular embodiment. Notch 322 creates an asymmetrical cross section for arm 303 taken along a plane that is parallel to the top surface of the arm, i.e., a plane which extends in the longitudinal direction of the arm. The invention is not limited to an arm with an asymmetry having the shape or dimensions shown in the figure or described above, or even a geometric asymmetry. Any feature which causes the arm to exhibit vertical coupling can be incorporated into the arm for use in accordance with the invention.

FIG. 11 is a cross section of the first illustrative embodiment shown in FIG. 10, taken along line 11-11 in FIG. 10.

FIG. 12 shows a second illustrative embodiment of the present invention. Actuator arm 403 has one notch 422 along top edge 420 of a first side of the arm, and a second notch 423 along bottom edge 421 of a second side of the arm. The two notches 422, 423 create an asymmetrical cross section for arm 403 taken along a plane that is parallel to the top surface of the arm, i.e., a plane which extends in the longitudinal direction of the arm.

FIG. 13 is a cross section of the first illustrative embodiment shown in FIG. 10, taken along line 13-13 in FIG. 12.

In both of the embodiments shown in FIGS. 10 and 12, the asymmetrical cross section extends for a substantial portion of the length of the elongated body portion 310 of support arm 303, and a corresponding elongated body portion of support arm 403. More particularly, preferably at least 25% of the elongated body portion of support arm 303/403 has an asymmetrical cross section, as measured from an axis of rotation of said support arm when mounted to an actuator motor to a distal end of said support arm, and more preferably at least 50% of the elongated body portion of support arm 303/403 has an asymmetrical cross section, as measured from an axis of rotation of said support arm when mounted to an actuator motor to a distal end of said support arm.

FIGS. 14 and 15 present the mechanical modeling results of the support arm of FIGS. 12 and 13 with notches in both the top and bottom surfaces, in response to arm bending. FIG. 14 shows the Z-axis (vertical) displacement and FIG. 15 shows the Y-axis (lateral) displacement. As shown in FIG. 15, the distal end of the suspension arm has displaced approximately 0.00232 mm laterally due to the vertical coupling effect of the notches in the arm, but the load beam has bent the slider back in the opposite direction due to the vertical coupling effect of the hinges. The net result is that the slider remains in essentially the same Y-position, and thus properly aligned with the data track on the platter, during arm bending. In other words, the asymmetry and vertical coupling of the suspension arm according to the present invention, when combined with the previously known offset hinges, results not only in significant TMR reduction during disc flutter mode, but also reduces or eliminates the unwanted side effect of arm induced TMR during arm bending mode.

Figure 16:
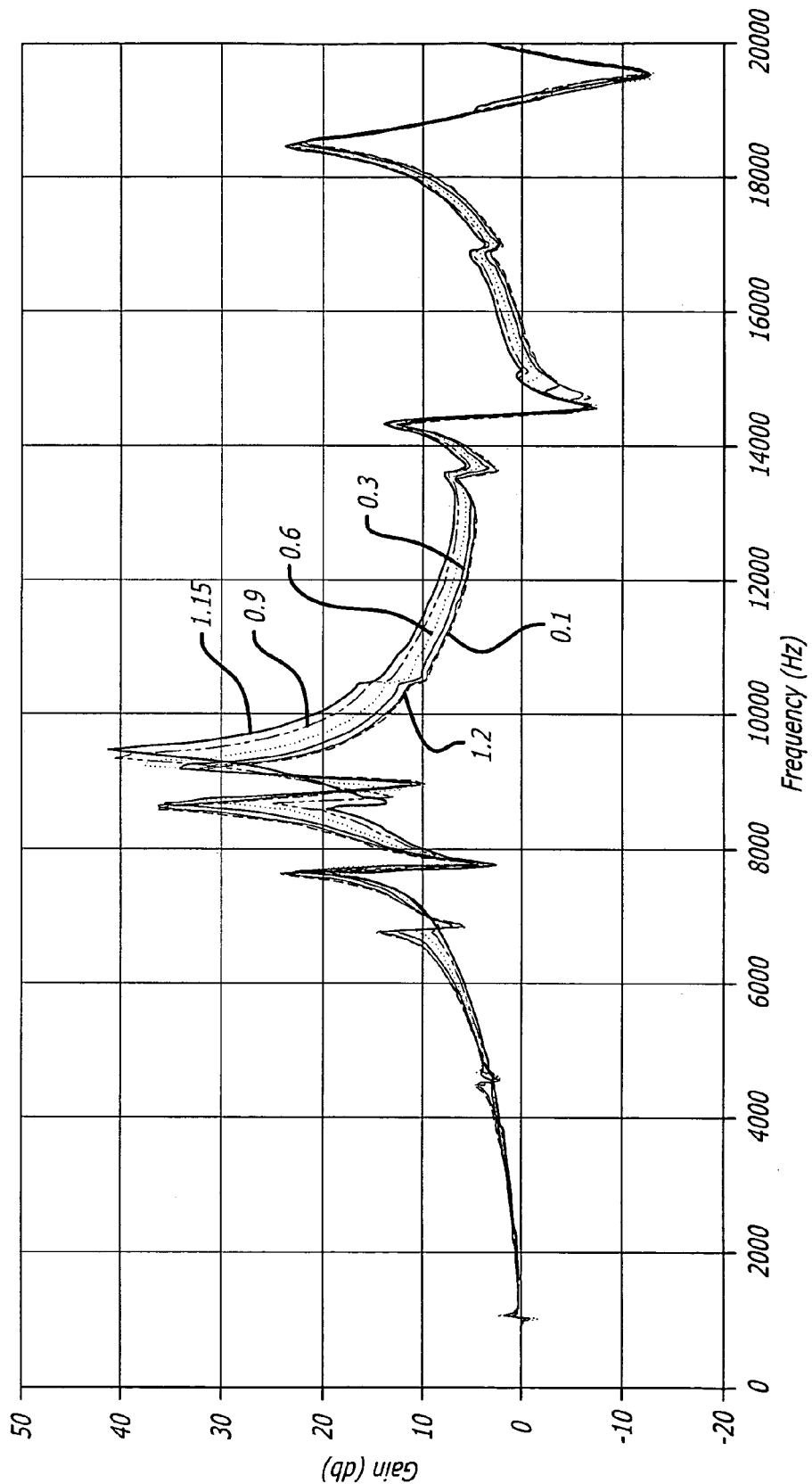
FIG. 16 is a plot of gain vs. frequency for the support arm of FIG. 12 having dual cutouts, for different cutout widths.

FIG. 16 shows the results of a simulation of YZ coupling, of the support arm of FIGS. 12 and 13 with one notch formed in the top surface and another notch formed in the bottom surface, with a step depth of half the thickness of the arm, for various step cutout widths according to mechanical modeling results. The different traces correspond to different cutout widths in millimeters.

Figure 17:
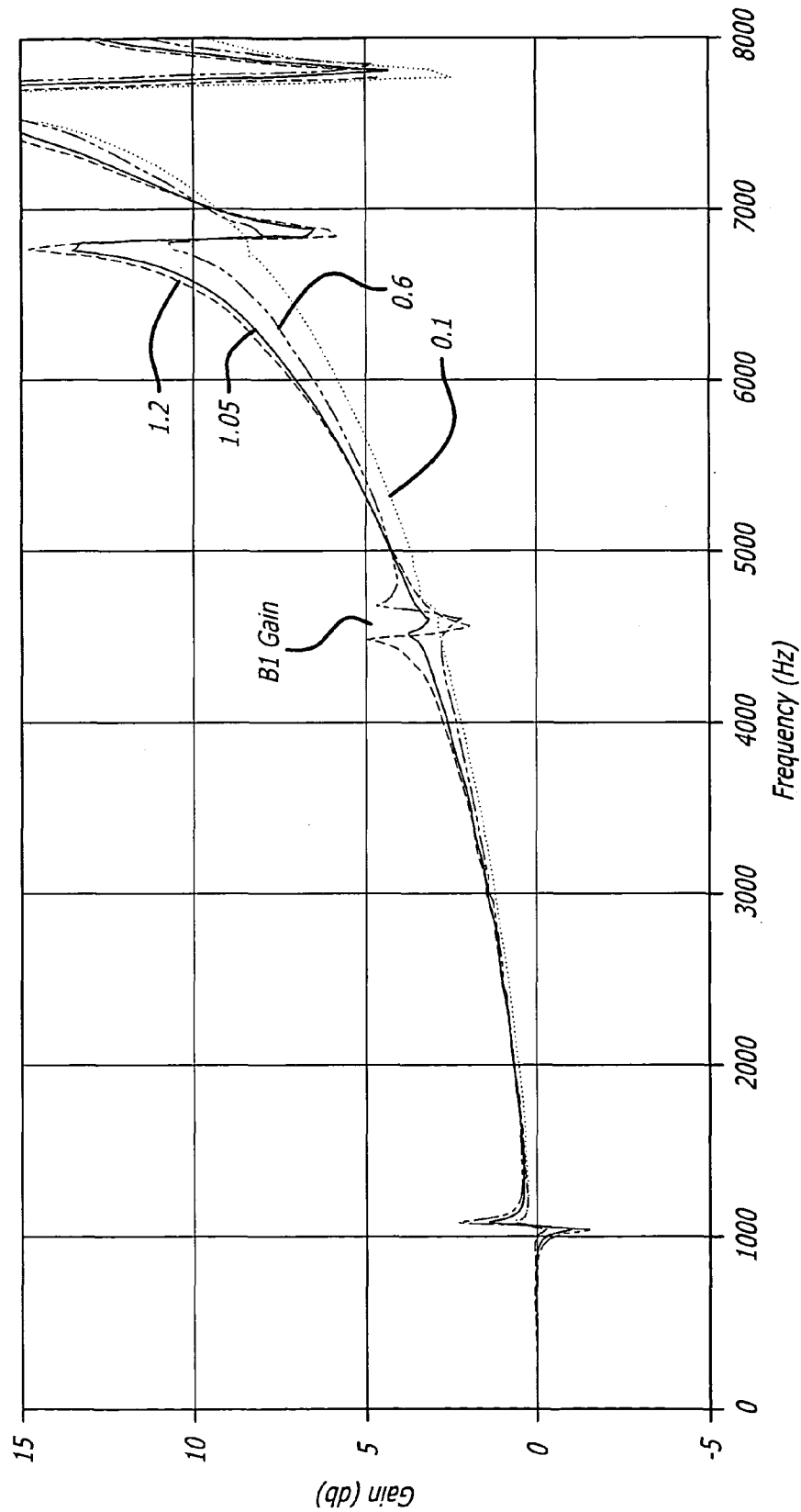
FIG. 17 is a closeup of the 0-8 KHz region of FIG. 16.

FIG. 17 is a closeup view of the 0-8 KHz region of FIG. 16. As the figure shows, the B1 gain actually decreases for larger cutout width values, despite the fact that the arm has become more asymmetrical. This is an unexpected result. It was previously believed that introducing an asymmetry into the suspension arm would increase the B1 gain, which would be undesirable. Thus, the inventor of the present invention has demonstrated that introducing an asymmetry in the suspension arm can not only largely eliminate undesirable arm bending induced TMR, but can also decrease the B1 gain which is desirable in and of itself.

Figure 18:
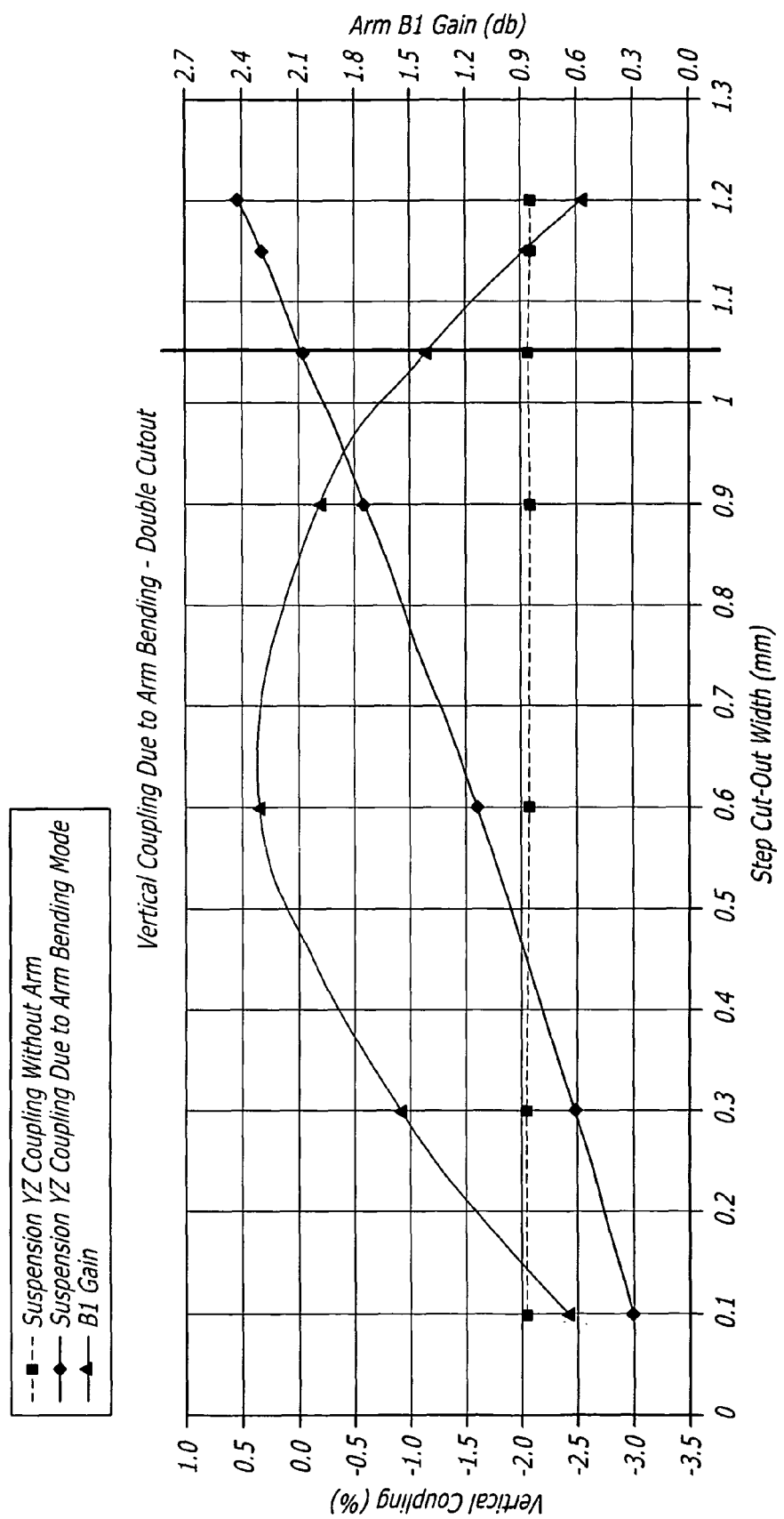
FIG. 18 is a plot of vertical coupling and arm B1 gain vs. step cut-out width for the double cutout embodiment of FIG. 12.

FIG. 18 shows the results of a simulation of YZ coupling due to arm bending, of the support arm of FIGS. 12 and 13 of the first embodiment having a double cutout in the arm and with a suspension having vertically offset hinges, for different step cut-out widths. The trace having the square data points shows the suspension YZ coupling, i.e., the YZ coupling for just the suspension without the arm bending. The suspension YZ coupling, i.e., the vertical coupling caused by the offset hinges alone, is a constant approximately—2.05% because the vertical coupling action of the hinges is independent of the action of the suspension arm. The trace having the diamond shaped data points shows the suspension YZ coupling during arm bending mode, i.e., when both the suspension and the support arm are bending. Ideally this combined vertical coupling should be zero. The trace crosses the horizontal axis, at which the combined vertical coupling is zero, at a step cutout width of 1.05 mm. That means that a step cutout width of 1.05 mm is considered ideal for this simulated design, at least before the B1 gain is taken into account. The trace having the triangle shaped data points shows the arm B1 gain for different cut-out widths. The lower the B1 gain, the better. The trace shows that at a step cutout width of 1.05 mm, the arm B1 gain is 1.4 which is considered to be an acceptably low B1 gain value. Thus for a suspension arm with steps formed in both the top and the bottom surfaces, having a thickness of 1 mm and a cutout depth of 0.5 mm, a step cutout width of 1.05 mm results in both excellent cancellation of arm bending induced TMR and a low B1 gain. A step cutout width of 1.05 mm is therefore currently considered optimal for this particular suspension assembly. It is believed that through additional design modifications it may be possible to further minimize the B1 gain caused by the hinge offset. Such design modifications could include a non-uniform cutout profile such as a step whose width, depth, and/or other parameters change across the length of the actuator arm, or which is discontinuous.

Figure 19:
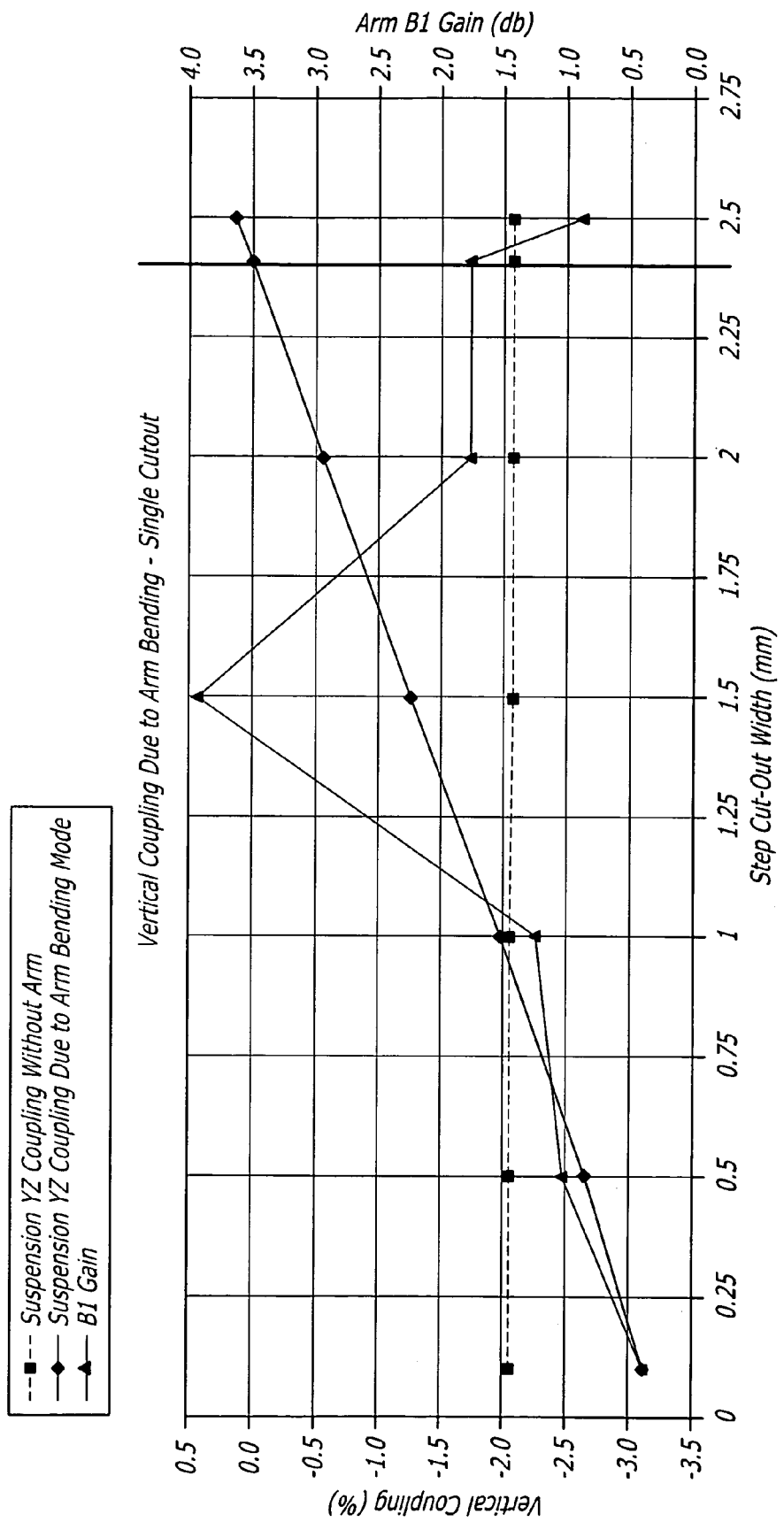
FIG. 19 is plot of vertical coupling and arm B1 gain vs. step cut-out width for the single cutout embodiment of FIG. 10.

FIG. 19 shows the results of a simulation of YZ coupling due to arm bending, of the support arm of the second embodiment of FIGS. 10 and 11 with a suspension having a single cutout in the arm and with vertically offset hinges, for different step cut-out widths. This arm design can cancel arm bending induced TMR with a cutout width of 2.4 mm. For this embodiment, a step cutout width of approximately 2.4 mm results in approximately complete cancellation of arm induced TMR, and produces a B1 gain of 1.8 which is considered to be an acceptably low value. It is believed that through additional design modifications it may be possible to further minimize the B1 gain caused by the hinge offset. Such design modifications could include a non-uniform cutout profile such as a step whose width, depth, and/or other parameters change across the length of the actuator arm, or which is discontinuous.

FIG. 20 shows an embodiment of the support arm of the present invention when used in combination with the previously invented load beam supported by offset hinges. FIG. 21 is a closeup thereof. As shown in the figures, the center of the data disk is toward the left of the load beam and support arm. When the load beam is bent downward, the offset hinges created by the shims causes the load beam to move slightly to the right, i.e., toward the outside of the platter. The asymmetrical cross section of the support arm is provided by a notch formed along the top inside edge of the support arm so that as the support arm bends upward away from the platter due to arm bending, the vertical coupling in the support arm causes the arm to move toward the inside of the platter. During upward arm bending, as shown by directional arrow A the support arm bends upward thus moving slightly toward the inside of the platter, and as shown by directional arrow B the load beam bends downward thus moving slightly toward the outside of the platter. Similarly, during downward arm bending the support arm bends downward thus moving slightly toward the outside of the platter, and the load beam bends upward thus moving slightly toward the inside of the platter. The net result is that during arm bending mode the slider stays closely aligned with the data track which it is reading, and arm bending TMR is significantly reduced or even eliminated.

FIG. 22 is a cross section of the support arm shown in FIG. 20 taken along section Y-Y. The cross section is vertically asymmetrical. That is, in the cross section shown in FIG. 22 taken along section Y-Y, the cross section is asymmetrical with respect to horizontal line Y'-Y'. It was previously believed that a support arm that is asymmetrical in this fashion would produce an unacceptably high B1 gain. In one aspect, therefore, the present invention includes a support arm whose lateral cross section is vertically asymmetrical. The asymmetry is such that, at a cross section defined by a vertical slice taken through the elongated body portion of the support arm, the cross sectional area toward the bottom half of the support arm is disposed relatively more toward the center of the disc platter and its axis of rotation, and the cross sectional area toward the top half of the support arm is disposed relatively more toward the outside of the disc platter.

As can be in FIGS. 10, 12, and 20, and their cross sections in FIGS. 11, 13, and 22, respectively, the step or notch 322 that is formed on the top inside edge 320 of actuator arm 303 (the arm edge that is closest to the axis of rotation of the data disc, and away from the disc platter surface) creates a thinner cross section at arm 303's inside edge 320 than at arm 303's lateral center along its longitudinal axis. Similarly, step or notch 423 on bottom outside edge 421 of actuator arm 403 (the arm edge that is farthest from the axis of rotation of the data disc, and closest to the disc platter surface) creates a thinner cross section at arm 403's outside edge 421 than at arm 403's lateral center along its longitudinal axis.

One of ordinary skill in the art would recognize many other variations, modifications, and alternatives. The above examples are merely illustrations, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A disc drive assembly comprising:
   a data disc and a motor for rotating said data disc;
   an actuator arm coupled to an actuator motor, the actuator arm having at least one of:
      a step extending along a first edge of said arm disposed away from said data disc and further disposed toward an axis of rotation of said data disc, the step along the first edge creating a thinner cross section at the first edge than at a lateral center of the arm; and
      a step extending along a second edge of said arm disposed toward said data disc and further disposed toward an outer edge of said data disc, the step along the second edge creating a thinner cross section at the second edge than at the lateral center of the arm; and
   a head gimbal assembly coupled to said actuator arm for reading data from said data disc:
   wherein said at least one step causes a distal end of said actuator arm to move laterally generally parallel to a surface of said disc when said actuator arm bends vertically due to vibration.

2. A support arm for a suspension in a disc drive, the suspension arm having a mounting end and a distal end, wherein:
   the support arm has an asymmetry that causes the distal end to move in a lateral direction when the distal end is bent in a vertical direction, the support arm asymmetry comprising:
   a first step formed in a first surface and along a first lateral edge of the support arm; and
   a second step formed in a second surface and along a second lateral edge of the support arm, said second surface being opposite from said first surface, and said second edge being opposite from said first edge.

3. The support arm of claim 2 wherein said movement of said distal end of said support arm substantially cancels out an opposite lateral movement at a slider during support arm bending due to vibration.

4. The support arm of claim 2 wherein said lateral movement comprises movement toward a center of a disc platter when said support arm bends away from said disc platter, and movement toward an outer edge of said disc platter when said support arm bends toward said disc platter.

5. The support arm of claim 2 wherein said asymmetry comprises, at a cross section of said support arm taken along a vertical slice through an elongated body portion of said support arm, cross sectional area closer to a disc platter associated with said support arm is disposed relatively more toward an axis of rotation of said disc platter, and cross sectional area farther away from said disc platter is disposed relatively more toward an outer edge of said disc platter.

6. The support arm of claim 2 wherein said first step has a depth of 30%-70% of a thickness of said support arm.

7. The support arm of claim 6 wherein said first step has a depth of approximately one half of said support arm thickness.

8. The support arm of claim 2, the disc driving including a disc having a data disc surface and an axis of rotation, wherein:
   said first surface of the support arm is disposed away from the data disc surface, and said first edge of the support arm is closer to the disc's axis of rotation.

9. A support arm for use in a suspension for a disc drive comprising:
   a proximal end for mounting to an actuator motor;
   a distal end for coupling to a load beam; and
   an elongated body section extending between said ends; wherein:
      the support arm incorporates means for causing the distal end of the support arm to move laterally in response to vertical bending of said arm so as to reduce arm induced track misregistration; and
      when the arm bends upward and the load beam bends downward, said means causes the distal end of the arm to move in a lateral direction toward an axis of rotation of a data disc associated with said support arm.

* * * * *